United States Patent
Hampson et al.

(10) Patent No.: US 11,248,108 B2
(45) Date of Patent: Feb. 15, 2022

(54) BINDER COMPOSITIONS AND USES THEREOF

(71) Applicant: KNAUF INSULATION SPRL, Vise (BE)

(72) Inventors: Carl Hampson, St. Helens (GB); Oliver Callaghan, St. Helens (GB)

( * ) Notice: Subject to any disclaimer, the term of this patent is extended or adjusted under 35 U.S.C. 154(b) by 0 days.

(21) Appl. No.: 16/481,575

(22) PCT Filed: Jan. 30, 2018

(86) PCT No.: PCT/EP2018/052279
§ 371 (c)(1),
(2) Date: Jul. 29, 2019

(87) PCT Pub. No.: WO2018/141746
PCT Pub. Date: Aug. 9, 2018

(65) Prior Publication Data
US 2020/0002512 A1    Jan. 2, 2020

(30) Foreign Application Priority Data

Jan. 31, 2017   (GB) ...................................... 1701569

(51) Int. Cl.
| | |
|---|---|
| C08L 1/08 | (2006.01) |
| C08K 5/1545 | (2006.01) |
| B27N 3/00 | (2006.01) |
| C09J 101/04 | (2006.01) |
| D04H 1/587 | (2012.01) |
| D04H 1/64 | (2012.01) |

(52) U.S. Cl.
CPC ................ *C08L 1/08* (2013.01); *B27N 3/002* (2013.01); *C08K 5/1545* (2013.01); *C09J 101/04* (2013.01); *D04H 1/587* (2013.01); *D04H 1/64* (2013.01)

(58) Field of Classification Search
None
See application file for complete search history.

(56) References Cited

U.S. PATENT DOCUMENTS

| | | | |
|---|---|---|---|
| 1,801,052 | A | 4/1931 | Meigs |
| 1,801,053 | A | 4/1931 | Meigs |
| 1,886,353 | A | 11/1932 | Novotny et al. |
| 1,902,948 | A | 3/1933 | Castle |

(Continued)

FOREIGN PATENT DOCUMENTS

| | | |
|---|---|---|
| AU | 8538765 | 8/1985 |
| AU | 9640921 | 7/1997 |

(Continued)

OTHER PUBLICATIONS

International Search Report and Written Opinion for PCT/US2008/059730, completed Sep. 22, 2008.

(Continued)

*Primary Examiner* — Peter A Salamon
(74) *Attorney, Agent, or Firm* — Knauf Insulation, Inc.; James K. Blodgett; Brandon N. Hudder

(57) ABSTRACT

The present invention relates to improved curable binder compositions comprising cellulose hydrolysate sugars and an inorganic ammonia salt, products making use thereof and a process for making such products. The invention binders show improved bond strength under dry and wet conditions.

12 Claims, 4 Drawing Sheets

(56) References Cited

U.S. PATENT DOCUMENTS

| | | | |
|---|---|---|---|
| 1,964,263 | A | 6/1934 | Krenke |
| 2,198,874 | A | 4/1940 | Leighton |
| 2,215,825 | A | 9/1940 | Wallace et al. |
| 2,261,295 | A | 11/1941 | Schlack |
| 2,362,086 | A | 11/1944 | Eastes et al. |
| 2,371,990 | A | 3/1945 | Hanford |
| 2,392,105 | A | 1/1946 | Sussman |
| 2,442,989 | A | 6/1948 | Sussman |
| 2,500,665 | A | 3/1950 | Courtright |
| 2,518,956 | A | 8/1950 | Sussman |
| 2,875,073 | A | 2/1959 | Gogek |
| 2,894,920 | A | 7/1959 | Ramos |
| 2,965,504 | A | 12/1960 | Gogek |
| 3,038,462 | A | 6/1962 | Bohdan |
| 3,138,473 | A | 6/1964 | Floyd et al. |
| 3,222,243 | A | 12/1965 | Gaston et al. |
| 3,231,349 | A | 1/1966 | Stalego |
| 3,232,821 | A | 2/1966 | Banks et al. |
| 3,297,419 | A | 1/1967 | Eyre, Jr. |
| 3,513,001 | A | 5/1970 | Woodhead et al. |
| 3,551,365 | A | 12/1970 | Matalon |
| 3,784,408 | A | 1/1974 | Jaffee et al. |
| 3,791,807 | A | 2/1974 | Etzel et al. |
| 3,802,897 | A | 4/1974 | Voigt et al. |
| 3,809,664 | A | 5/1974 | Burr et al. |
| 3,826,767 | A | 7/1974 | Hoover et al. |
| 3,856,606 | A | 12/1974 | Fan et al. |
| 3,867,119 | A | 2/1975 | Takeo et al. |
| 3,907,724 | A | 9/1975 | Higginbottom |
| 3,911,048 | A | 10/1975 | Vargiu et al. |
| 3,919,134 | A | 11/1975 | Higginbottom |
| 3,922,466 | A | 11/1975 | Bell et al. |
| 3,955,031 | A | 5/1976 | Jones et al. |
| 3,956,204 | A | 5/1976 | Higginbottom |
| 3,961,081 | A | 6/1976 | McKenzie |
| 3,971,807 | A | 7/1976 | Brack |
| 4,014,726 | A | 3/1977 | Fargo |
| 4,028,290 | A | 6/1977 | Reid |
| 4,048,127 | A | 9/1977 | Gibbons et al. |
| 4,054,713 | A | 10/1977 | Sakaguchi et al. |
| 4,085,076 | A | 4/1978 | Gibbons et al. |
| 4,097,427 | A | 6/1978 | Aitken et al. |
| 4,107,379 | A | 8/1978 | Stofko |
| 4,109,057 | A | 8/1978 | Nakamura et al. |
| 4,144,027 | A | 3/1979 | Habib |
| 4,148,765 | A | 4/1979 | Nelson |
| 4,183,997 | A | 1/1980 | Stofko |
| 4,184,986 | A | 1/1980 | Krasnobajew et al. |
| 4,186,053 | A | 1/1980 | Krasnobajew et al. |
| 4,201,247 | A | 5/1980 | Shannon |
| 4,201,857 | A | 5/1980 | Krasnobajew et al. |
| 4,217,414 | A | 8/1980 | Walon |
| 4,233,432 | A | 11/1980 | Curtis, Jr. |
| 4,246,367 | A | 1/1981 | Curtis, Jr. |
| 4,259,190 | A | 3/1981 | Fahey |
| 4,265,963 | A | 5/1981 | Matalon |
| 4,278,573 | A | 7/1981 | Tessler |
| 4,296,173 | A | 10/1981 | Fahey |
| 4,301,310 | A | 11/1981 | Wagner |
| 4,310,585 | A | 1/1982 | Shannon |
| 4,322,523 | A | 3/1982 | Wagner |
| 4,330,443 | A | 5/1982 | Rankin |
| 4,333,484 | A | 6/1982 | Keritsis |
| 4,357,194 | A | 11/1982 | Stofko |
| 4,361,588 | A | 11/1982 | Herz |
| 4,379,101 | A | 4/1983 | Smith |
| 4,393,019 | A | 7/1983 | Geimer |
| 4,396,430 | A | 8/1983 | Matalon |
| 4,400,496 | A | 8/1983 | Butler et al. |
| 4,464,523 | A | 8/1984 | Neigel et al. |
| 4,506,684 | A | 3/1985 | Keritsis |
| 4,520,143 | A | 5/1985 | Jellinek |
| 4,524,164 | A | 6/1985 | Viswanathan et al. |
| 4,631,226 | A | 12/1986 | Jellinek |
| 4,654,259 | A | 3/1987 | Stofko |
| 4,668,716 | A | 5/1987 | Pepe et al. |
| 4,692,478 | A | 9/1987 | Viswanathan et al. |
| 4,714,727 | A | 12/1987 | Hume, III |
| 4,720,295 | A | 1/1988 | Bronshtein |
| 4,734,996 | A | 4/1988 | Kim et al. |
| 4,737,406 | A * | 4/1988 | Bumpus ............... D06M 11/55 106/18.16 |
| 4,754,056 | A | 6/1988 | Ansel et al. |
| 4,761,184 | A | 8/1988 | Markessini |
| 4,780,339 | A | 10/1988 | Lacourse et al. |
| 4,824,483 | A * | 4/1989 | Bumpus ............... D06M 11/55 106/18.12 |
| 4,828,643 | A | 5/1989 | Newman et al. |
| 4,845,162 | A | 7/1989 | Schmitt et al. |
| 4,906,237 | A | 3/1990 | Johansson et al. |
| 4,912,147 | A | 3/1990 | Pfoehler et al. |
| 4,918,861 | A | 4/1990 | Carpenter et al. |
| 4,923,980 | A | 5/1990 | Blomberg |
| 4,950,444 | A | 8/1990 | Deboufie et al. |
| 4,988,780 | A | 1/1991 | Das et al. |
| 4,992,519 | A | 2/1991 | Mukherjee |
| 5,001,202 | A | 3/1991 | Denis et al. |
| 5,013,405 | A | 5/1991 | Izard |
| 5,023,019 | A * | 6/1991 | Bumpus ............... C09K 21/02 106/18.12 |
| 5,032,431 | A | 7/1991 | Conner et al. |
| 5,037,930 | A | 8/1991 | Shih |
| 5,041,595 | A | 8/1991 | Yang et al. |
| 5,089,342 | A | 2/1992 | Dhein et al. |
| 5,095,054 | A | 3/1992 | Lay et al. |
| 5,106,615 | A | 4/1992 | Dikstein |
| 5,114,004 | A | 5/1992 | Isono et al. |
| 5,123,949 | A | 6/1992 | Thiessen |
| 5,124,369 | A | 6/1992 | Vandichel et al. |
| 5,128,407 | A | 7/1992 | Layton et al. |
| 5,143,582 | A | 9/1992 | Arkens et al. |
| 5,151,465 | A | 9/1992 | Le-Khac |
| 5,167,738 | A | 12/1992 | Bichot et al. |
| 5,198,492 | A | 3/1993 | Stack |
| 5,217,741 | A | 6/1993 | Kawachi et al. |
| 5,218,048 | A | 6/1993 | Abe et al. |
| 5,240,498 | A | 8/1993 | Matalon et al. |
| 5,278,222 | A | 1/1994 | Stack |
| 5,300,144 | A | 4/1994 | Adams |
| 5,300,192 | A | 4/1994 | Hansen et al. |
| 5,308,896 | A | 5/1994 | Hansen et al. |
| 5,318,990 | A | 6/1994 | Strauss |
| 5,336,753 | A | 8/1994 | Jung et al. |
| 5,336,755 | A | 8/1994 | Pape |
| 5,336,766 | A | 8/1994 | Koga et al. |
| 5,340,868 | A | 8/1994 | Strauss et al. |
| 5,352,480 | A | 10/1994 | Hansen et al. |
| 5,367,849 | A | 11/1994 | Bullock |
| 5,371,194 | A | 12/1994 | Ferretti |
| 5,387,665 | A | 2/1995 | Misawa et al. |
| 5,389,716 | A | 2/1995 | Graves |
| 5,393,849 | A | 2/1995 | Srinivasan et al. |
| 5,416,139 | A | 5/1995 | Zeiszler |
| 5,421,838 | A | 6/1995 | Gosset et al. |
| 5,424,418 | A | 6/1995 | Duflot |
| 5,434,233 | A | 7/1995 | Kiely et al. |
| 5,447,977 | A | 9/1995 | Hansen et al. |
| 5,470,843 | A | 11/1995 | Stahl et al. |
| 5,480,973 | A | 1/1996 | Goodlad et al. |
| 5,492,756 | A | 2/1996 | Seale et al. |
| 5,498,662 | A | 3/1996 | Tanaka et al. |
| 5,503,920 | A | 4/1996 | Alkire et al. |
| 5,534,612 | A | 7/1996 | Taylor et al. |
| 5,536,766 | A | 7/1996 | Seyffer et al. |
| 5,538,783 | A | 7/1996 | Hansen et al. |
| 5,543,215 | A | 8/1996 | Hansen et al. |
| 5,545,279 | A | 8/1996 | Hall et al. |
| 5,547,541 | A | 8/1996 | Hansen et al. |
| 5,547,745 | A | 8/1996 | Hansen et al. |
| 5,550,189 | A | 8/1996 | Qin et al. |
| 5,554,730 | A | 9/1996 | Woiszwillo et al. |
| 5,562,740 | A | 10/1996 | Cook et al. |
| 5,571,618 | A | 11/1996 | Hansen et al. |
| 5,578,678 | A | 11/1996 | Hartmann et al. |

(56) References Cited

U.S. PATENT DOCUMENTS

| | | | |
|---|---|---|---|
| 5,580,856 A | 12/1996 | Prestrelski et al. | |
| 5,582,682 A | 12/1996 | Ferretti | |
| 5,583,193 A | 12/1996 | Aravindakshan et al. | |
| 5,589,256 A | 12/1996 | Hansen et al. | |
| 5,589,536 A | 12/1996 | Golino et al. | |
| 5,607,759 A | 3/1997 | Hansen et al. | |
| 5,608,011 A | 3/1997 | Eck et al. | |
| 5,609,727 A | 3/1997 | Hansen et al. | |
| 5,614,570 A | 3/1997 | Hansen et al. | |
| 5,620,940 A | 4/1997 | Birbara et al. | |
| 5,621,026 A | 4/1997 | Tanaka et al. | |
| 5,633,298 A | 5/1997 | Arfaei et al. | |
| 5,641,561 A | 6/1997 | Hansen et al. | |
| 5,643,978 A | 7/1997 | Darwin et al. | |
| 5,645,756 A | 7/1997 | Dubin et al. | |
| 5,660,904 A | 8/1997 | Andersen et al. | |
| 5,661,213 A | 8/1997 | Arkens et al. | |
| 5,670,585 A | 9/1997 | Taylor et al. | |
| 5,672,418 A | 9/1997 | Hansen et al. | |
| 5,672,659 A | 9/1997 | Shalaby et al. | |
| 5,690,715 A | 11/1997 | Schiwek | |
| 5,691,060 A | 11/1997 | Levy | |
| 5,693,411 A | 12/1997 | Hansen et al. | |
| 5,719,092 A | 2/1998 | Arrington | |
| 5,719,228 A | 2/1998 | Taylor et al. | |
| 5,733,624 A | 3/1998 | Syme et al. | |
| 5,756,580 A | 5/1998 | Natori et al. | |
| 5,763,524 A | 6/1998 | Arkens et al. | |
| 5,788,243 A | 8/1998 | Harshaw et al. | |
| 5,788,423 A | 8/1998 | Perkins | |
| 5,807,364 A | 9/1998 | Hansen | |
| 5,855,987 A | 1/1999 | Margel et al. | |
| 5,863,985 A | 1/1999 | Shalaby et al. | |
| 5,885,337 A | 3/1999 | Nohr et al. | |
| 5,895,804 A | 4/1999 | Lee et al. | |
| 5,905,115 A | 5/1999 | Luitjes et al. | |
| 5,916,503 A | 6/1999 | Rettenbacher | |
| 5,919,528 A | 7/1999 | Huijs et al. | |
| 5,919,831 A | 7/1999 | Philipp | |
| 5,922,403 A | 7/1999 | Tecle | |
| 5,925,722 A | 7/1999 | Exner et al. | |
| 5,929,184 A | 7/1999 | Holmes-Farley et al. | |
| 5,929,196 A | 7/1999 | Kissel et al. | |
| 5,932,344 A | 8/1999 | Ikemoto et al. | |
| 5,932,665 A | 8/1999 | DePorter et al. | |
| 5,932,689 A | 8/1999 | Arkens et al. | |
| 5,942,123 A | 8/1999 | McArdle | |
| 5,954,869 A | 9/1999 | Elfersy et al. | |
| 5,977,224 A | 11/1999 | Cheung et al. | |
| 5,977,232 A | 11/1999 | Arkens et al. | |
| 5,981,719 A | 11/1999 | Woiszwillo et al. | |
| 5,983,586 A | 11/1999 | Berdan, II et al. | |
| 5,990,216 A | 11/1999 | Cai et al. | |
| 5,993,709 A | 11/1999 | Bonomo et al. | |
| 6,022,615 A | 2/2000 | Rettenbacher | |
| 6,067,821 A | 5/2000 | Jackson et al. | |
| 6,071,549 A | 6/2000 | Hansen | |
| 6,071,994 A | 6/2000 | Hummerich et al. | |
| 6,072,086 A | 6/2000 | James et al. | |
| 6,077,883 A | 6/2000 | Taylor et al. | |
| 6,090,925 A | 7/2000 | Woiszwillo et al. | |
| 6,114,033 A | 9/2000 | Ikemoto et al. | |
| 6,114,464 A | 9/2000 | Reck et al. | |
| 6,133,347 A | 10/2000 | Vickers, Jr. et al. | |
| 6,136,916 A | 10/2000 | Arkens et al. | |
| 6,139,619 A | 10/2000 | Zaretskiy et al. | |
| 6,143,243 A | 11/2000 | Gershun et al. | |
| 6,171,444 B1 | 1/2001 | Nigam | |
| 6,171,654 B1 | 1/2001 | Salsman et al. | |
| 6,180,037 B1 | 1/2001 | Anderson et al. | |
| 6,194,512 B1 | 2/2001 | Chen et al. | |
| 6,210,472 B1 | 4/2001 | Kwan et al. | |
| 6,221,958 B1 | 4/2001 | Shalaby et al. | |
| 6,221,973 B1 | 4/2001 | Arkens et al. | |
| 6,231,721 B1 | 5/2001 | Quick et al. | |
| 6,274,661 B1 | 8/2001 | Chen et al. | |
| 6,281,298 B1 | 8/2001 | Papsin, Jr. | |
| 6,299,677 B1 | 10/2001 | Johnson et al. | |
| 6,299,936 B1 | 10/2001 | Reck et al. | |
| 6,307,732 B1 | 10/2001 | Tsubaki et al. | |
| 6,310,227 B1 | 10/2001 | Sarama et al. | |
| 6,313,102 B1 | 11/2001 | Colaco et al. | |
| 6,319,683 B1 | 11/2001 | James et al. | |
| 6,331,350 B1 | 12/2001 | Taylor et al. | |
| 6,331,513 B1 | 12/2001 | Zaid et al. | |
| 6,340,411 B1 | 1/2002 | Hansen et al. | |
| 6,348,530 B1 | 2/2002 | Reck et al. | |
| 6,365,079 B1 | 4/2002 | Winkler et al. | |
| 6,372,077 B1 | 4/2002 | Tecle | |
| 6,379,739 B1 | 4/2002 | Formanek et al. | |
| 6,379,814 B1 | 4/2002 | Dupre et al. | |
| 6,395,856 B1 | 5/2002 | Petty et al. | |
| 6,403,665 B1 | 6/2002 | Sieker et al. | |
| 6,407,225 B1 | 6/2002 | Mang et al. | |
| 6,410,036 B1 | 6/2002 | De Rosa et al. | |
| 6,440,204 B1 | 8/2002 | Rogols et al. | |
| 6,441,122 B1 | 8/2002 | DeMott et al. | |
| 6,461,553 B1 | 10/2002 | Hansen et al. | |
| 6,468,442 B2 | 10/2002 | Bytnar | |
| 6,468,730 B2 | 10/2002 | Fujiwara et al. | |
| 6,469,120 B1 | 10/2002 | Elfersy et al. | |
| 6,475,552 B1 | 11/2002 | Shah et al. | |
| 6,482,875 B2 | 11/2002 | Lorenz et al. | |
| 6,495,656 B1 | 12/2002 | Haile et al. | |
| 6,521,339 B1 | 2/2003 | Hansen et al. | |
| 6,525,009 B2 | 2/2003 | Sachdev et al. | |
| 6,538,057 B1 | 3/2003 | Wildburg et al. | |
| 6,547,867 B2 | 4/2003 | Rogols et al. | |
| 6,555,616 B1 | 4/2003 | Helbing et al. | |
| 6,559,302 B1 | 5/2003 | Shah et al. | |
| 6,562,267 B1 | 5/2003 | Hansen et al. | |
| 6,596,103 B1 | 7/2003 | Hansen et al. | |
| 6,613,378 B1 | 9/2003 | Erhan et al. | |
| 6,638,882 B1 | 10/2003 | Helbing et al. | |
| 6,638,884 B2 | 10/2003 | Quick et al. | |
| 6,699,945 B1 | 3/2004 | Chen et al. | |
| 6,706,853 B1 | 3/2004 | Stanssens et al. | |
| 6,719,862 B2 | 4/2004 | Quick et al. | |
| 6,730,730 B1 | 5/2004 | Hansen et al. | |
| 6,753,361 B2 | 6/2004 | Kroner et al. | |
| 6,818,694 B2 | 11/2004 | Hindi et al. | |
| 6,821,547 B2 | 11/2004 | Shah et al. | |
| 6,852,247 B2 | 2/2005 | Bytnar | |
| 6,858,074 B2 | 2/2005 | Anderson et al. | |
| 6,861,495 B2 | 3/2005 | Barsotti et al. | |
| 6,864,044 B2 | 3/2005 | Ishikawa et al. | |
| 6,878,800 B2 | 4/2005 | Husemoen et al. | |
| 6,884,849 B2 | 4/2005 | Chen et al. | |
| 6,955,844 B2 | 10/2005 | Tagge et al. | |
| 6,962,714 B2 | 11/2005 | Hei et al. | |
| 6,989,171 B2 | 1/2006 | Portman | |
| 6,992,203 B2 | 1/2006 | Trusovs | |
| 7,018,490 B2 | 3/2006 | Hansen et al. | |
| 7,029,717 B1 | 4/2006 | Ojima et al. | |
| 7,067,579 B2 | 6/2006 | Taylor et al. | |
| 7,083,831 B1 | 8/2006 | Koch et al. | |
| 7,090,745 B2 | 8/2006 | Beckman et al. | |
| 7,141,626 B2 | 11/2006 | Rodrigues et al. | |
| 7,144,474 B1 | 12/2006 | Hansen et al. | |
| 7,195,792 B2 | 3/2007 | Boston et al. | |
| 7,201,778 B2 | 4/2007 | Smith et al. | |
| 7,201,825 B2 | 4/2007 | Dezutter et al. | |
| 7,202,326 B2 | 4/2007 | Kuroda et al. | |
| 7,241,487 B2 | 7/2007 | Taylor et al. | |
| 7,458,235 B2 | 12/2008 | Beaufils et al. | |
| 7,514,027 B2 | 4/2009 | Horres et al. | |
| 7,655,711 B2 | 2/2010 | Swift et al. | |
| 7,772,347 B2 | 8/2010 | Swift et al. | |
| 7,795,354 B2 | 9/2010 | Srinivasan et al. | |
| 7,803,879 B2 | 9/2010 | Srinivasan et al. | |
| 7,807,771 B2 | 10/2010 | Swift et al. | |
| 7,842,382 B2 | 11/2010 | Helbing | |
| 7,854,980 B2 | 12/2010 | Jackson et al. | |
| 7,883,693 B2 | 2/2011 | Sehl et al. | |

(56) References Cited

U.S. PATENT DOCUMENTS

| | | |
|---|---|---|
| 7,888,445 B2 | 2/2011 | Swift et al. |
| 7,947,765 B2 | 5/2011 | Swift et al. |
| 8,114,210 B2 | 2/2012 | Hampson et al. |
| 8,182,648 B2 | 5/2012 | Swift et al. |
| 8,211,923 B2 | 7/2012 | Wagner et al. |
| 8,372,900 B2 | 2/2013 | Shooshtari et al. |
| 8,377,564 B2 | 2/2013 | Shooshtari et al. |
| 8,501,838 B2 | 8/2013 | Jackson et al. |
| 8,680,224 B2 | 3/2014 | Zhang et al. |
| 8,691,934 B2 | 4/2014 | Helbing et al. |
| 8,900,495 B2 | 12/2014 | Pacorel et al. |
| 2001/0017427 A1 | 8/2001 | Rosthauser et al. |
| 2001/0046824 A1 | 11/2001 | Nigam |
| 2002/0000100 A1 | 1/2002 | Burg et al. |
| 2002/0025435 A1 | 2/2002 | Hansen et al. |
| 2002/0026025 A1 | 2/2002 | Kuo et al. |
| 2002/0028857 A1 | 3/2002 | Holy |
| 2002/0032253 A1 | 3/2002 | Lorenz et al. |
| 2002/0042473 A1 | 4/2002 | Trollsas et al. |
| 2002/0091185 A1 | 7/2002 | Taylor et al. |
| 2002/0096278 A1 | 7/2002 | Foster et al. |
| 2002/0123598 A1 | 9/2002 | Sieker et al. |
| 2002/0130439 A1 | 9/2002 | Kroner et al. |
| 2002/0161108 A1 | 10/2002 | Schultz et al. |
| 2002/0197352 A1 | 12/2002 | Portman |
| 2003/0005857 A1 | 1/2003 | Minami et al. |
| 2003/0040239 A1 | 2/2003 | Toas et al. |
| 2003/0044513 A1 | 3/2003 | Shah et al. |
| 2003/0066523 A1 | 4/2003 | Lewis et al. |
| 2003/0071879 A1 | 4/2003 | Swenson |
| 2003/0116294 A1 | 6/2003 | Kehrer et al. |
| 2003/0134945 A1 | 7/2003 | Capps |
| 2003/0148084 A1 | 8/2003 | Trocino |
| 2003/0153690 A1 | 8/2003 | Husemoen et al. |
| 2003/0185991 A1 | 10/2003 | Wigger et al. |
| 2003/0203117 A1 | 10/2003 | Bartkowiak et al. |
| 2004/0002567 A1 | 1/2004 | Chen et al. |
| 2004/0019168 A1 | 1/2004 | Soerens et al. |
| 2004/0024170 A1 | 2/2004 | Husemoen et al. |
| 2004/0033269 A1 | 2/2004 | Hei et al. |
| 2004/0033747 A1 | 2/2004 | Miller et al. |
| 2004/0034154 A1 | 2/2004 | Tutin et al. |
| 2004/0038017 A1 | 2/2004 | Tutin et al. |
| 2004/0048531 A1 | 3/2004 | Belmares et al. |
| 2004/0077055 A1 | 4/2004 | Fosdick et al. |
| 2004/0079499 A1 | 4/2004 | Dezutter et al. |
| 2004/0087024 A1 | 5/2004 | Bellocq et al. |
| 2004/0087719 A1 | 5/2004 | Rautschek et al. |
| 2004/0122166 A1 | 6/2004 | O'Brien-Bernini et al. |
| 2004/0131874 A1 | 7/2004 | Tutin et al. |
| 2004/0144706 A1 | 7/2004 | Beaufils et al. |
| 2004/0152824 A1 | 8/2004 | Dobrowolski |
| 2004/0161993 A1 | 8/2004 | Tripp et al. |
| 2004/0209851 A1 | 10/2004 | Nelson et al. |
| 2004/0213930 A1 | 10/2004 | Halabisky |
| 2004/0220368 A1 | 11/2004 | Li et al. |
| 2004/0249066 A1 | 12/2004 | Heinzman et al. |
| 2004/0254285 A1 | 12/2004 | Rodrigues et al. |
| 2004/0260082 A1 | 12/2004 | Van Der Wilden et al. |
| 2005/0001198 A1 | 1/2005 | Bytnar |
| 2005/0017394 A1 | 1/2005 | Hochsmann et al. |
| 2005/0027283 A1 | 2/2005 | Richard et al. |
| 2005/0033037 A1 | 2/2005 | Trusovs |
| 2005/0048212 A1 | 3/2005 | Clamen et al. |
| 2005/0059770 A1 | 3/2005 | Srinivasan et al. |
| 2005/0171085 A1 | 8/2005 | Pinto et al. |
| 2005/0196421 A1 | 9/2005 | Hunter et al. |
| 2005/0202224 A1 | 9/2005 | Helbing |
| 2005/0208852 A1 | 9/2005 | Weber |
| 2005/0215153 A1 | 9/2005 | Cossement et al. |
| 2005/0245669 A1 | 11/2005 | Clungeon et al. |
| 2005/0275133 A1 | 12/2005 | Cabell et al. |
| 2005/0288479 A1 | 12/2005 | Kuroda et al. |
| 2006/0005580 A1 | 1/2006 | Espiard et al. |
| 2006/0009569 A1 | 1/2006 | Charbonneau et al. |
| 2006/0044302 A1 | 3/2006 | Chen |
| 2006/0099870 A1 | 5/2006 | Garcia et al. |
| 2006/0111480 A1 | 5/2006 | Hansen et al. |
| 2006/0124538 A1 | 6/2006 | Morcrette et al. |
| 2006/0135433 A1 | 6/2006 | Murray et al. |
| 2006/0141177 A1 | 6/2006 | Ligtenberg et al. |
| 2006/0179892 A1 | 8/2006 | Horres et al. |
| 2006/0188465 A1 | 8/2006 | Perrier et al. |
| 2006/0198954 A1 | 9/2006 | Frechem et al. |
| 2006/0231487 A1 | 10/2006 | Bartley et al. |
| 2006/0252855 A1 | 11/2006 | Pisanova et al. |
| 2006/0281622 A1 | 12/2006 | Maricourt et al. |
| 2007/0006390 A1 | 1/2007 | Clamen et al. |
| 2007/0009582 A1 | 1/2007 | Madsen et al. |
| 2007/0027281 A1 | 2/2007 | Michl et al. |
| 2007/0039520 A1 | 2/2007 | Crews et al. |
| 2007/0082983 A1 | 4/2007 | Crews et al. |
| 2007/0123679 A1 | 5/2007 | Swift et al. |
| 2007/0123680 A1 | 5/2007 | Swift et al. |
| 2007/0129522 A1 | 6/2007 | Burckhardt et al. |
| 2007/0142596 A1 | 6/2007 | Swift et al. |
| 2007/0158022 A1 | 7/2007 | Heep et al. |
| 2007/0184740 A1 | 8/2007 | Keller et al. |
| 2007/0191574 A1 | 8/2007 | Miller et al. |
| 2007/0270070 A1 | 11/2007 | Hamed |
| 2007/0287018 A1 | 12/2007 | Tutin et al. |
| 2007/0292618 A1 | 12/2007 | Srinivasan et al. |
| 2007/0292619 A1 | 12/2007 | Srinivasan et al. |
| 2007/0298274 A1 | 12/2007 | Eriksson et al. |
| 2008/0009209 A1 | 1/2008 | Clamen et al. |
| 2008/0009616 A1 | 1/2008 | Frank et al. |
| 2008/0051539 A1 | 2/2008 | Kelly |
| 2008/0060551 A1 | 3/2008 | Crews et al. |
| 2008/0081138 A1 | 4/2008 | Moore et al. |
| 2008/0108741 A1 | 5/2008 | Van Herwijnen et al. |
| 2008/0160260 A1 | 7/2008 | Wada et al. |
| 2008/0160302 A1 | 7/2008 | Asrar et al. |
| 2008/0194738 A1 | 8/2008 | Crews et al. |
| 2009/0169867 A1 | 7/2009 | Kelly |
| 2009/0170978 A1 | 7/2009 | Kelly |
| 2009/0227732 A1 | 9/2009 | Glockner et al. |
| 2009/0301972 A1 | 12/2009 | Hines et al. |
| 2009/0304919 A1 | 12/2009 | Wagner et al. |
| 2009/0306255 A1 | 12/2009 | Patel et al. |
| 2009/0324915 A1 | 12/2009 | Swift et al. |
| 2010/0029160 A1 | 2/2010 | Srinivasan et al. |
| 2010/0058661 A1 | 3/2010 | Jackson et al. |
| 2010/0080976 A1 | 4/2010 | Jackson et al. |
| 2010/0084598 A1 | 4/2010 | Jackson et al. |
| 2010/0086726 A1 | 4/2010 | Jackson et al. |
| 2010/0087571 A1 | 4/2010 | Jackson et al. |
| 2010/0098947 A1 | 4/2010 | Inoue et al. |
| 2010/0117023 A1 | 5/2010 | Dopico et al. |
| 2010/0129640 A1 | 5/2010 | Kelly |
| 2010/0130649 A1 | 5/2010 | Swift et al. |
| 2010/0175826 A1 | 7/2010 | Huenig et al. |
| 2010/0210595 A1 | 8/2010 | Wagner et al. |
| 2010/0222463 A1 | 9/2010 | Brady et al. |
| 2010/0222566 A1 | 9/2010 | Fosdick et al. |
| 2010/0282996 A1 | 11/2010 | Jaffrennou et al. |
| 2010/0301256 A1 | 12/2010 | Hampson et al. |
| 2010/0320113 A1 | 12/2010 | Swift |
| 2011/0021672 A1 | 1/2011 | Crews et al. |
| 2011/0039111 A1 | 2/2011 | Shooshtari |
| 2011/0040010 A1 | 2/2011 | Shooshtari |
| 2011/0042303 A1 | 2/2011 | Shooshtari et al. |
| 2011/0045966 A1 | 2/2011 | Shooshtari et al. |
| 2011/0089074 A1 | 4/2011 | Jackson et al. |
| 2011/0135937 A1 | 6/2011 | Swift et al. |
| 2011/0190425 A1 | 8/2011 | Swift |
| 2011/0220835 A1 | 9/2011 | Swift et al. |
| 2011/0256790 A1 | 10/2011 | Toas et al. |
| 2011/0260094 A1 | 10/2011 | Hampson et al. |
| 2011/0262648 A1 | 10/2011 | Lee et al. |
| 2011/0263757 A1 | 10/2011 | Rand et al. |
| 2011/0306726 A1 | 12/2011 | Bailey et al. |
| 2012/0133073 A1 | 5/2012 | Pacorel et al. |
| 2012/0156954 A1 | 6/2012 | Eckert et al. |

(56) References Cited

U.S. PATENT DOCUMENTS

| | | | |
|---|---|---|---|
| 2013/0029150 A1* | 1/2013 | Appley | C09D 5/004 428/391 |
| 2013/0032749 A1 | 2/2013 | Jaffrennou et al. | |
| 2013/0047888 A1* | 2/2013 | Mueller | C08G 16/00 106/163.01 |
| 2013/0059075 A1 | 3/2013 | Appley et al. | |
| 2013/0082205 A1 | 4/2013 | Mueller et al. | |
| 2013/0174758 A1 | 7/2013 | Mueller | |
| 2013/0234362 A1 | 9/2013 | Swift et al. | |
| 2013/0236650 A1 | 9/2013 | Swift et al. | |
| 2013/0237113 A1 | 9/2013 | Swift et al. | |
| 2013/0244524 A1 | 9/2013 | Swift et al. | |
| 2014/0091247 A1 | 4/2014 | Jackson et al. | |
| 2014/0134909 A1 | 5/2014 | Guo et al. | |
| 2014/0323618 A1* | 10/2014 | Appley | C08G 14/00 524/14 |
| 2014/0357787 A1 | 12/2014 | Jobber et al. | |
| 2015/0010949 A1* | 1/2015 | Jackson | C09J 101/02 435/84 |
| 2016/0177057 A1* | 6/2016 | Hjelmgaard | E04C 2/16 106/217.5 |
| 2016/0177068 A1* | 6/2016 | Hjelmgaard | C08L 5/00 106/217.5 |
| 2017/0210952 A1* | 7/2017 | Hampson | B27K 3/02 |
| 2020/0002512 A1* | 1/2020 | Hampson | D04H 1/64 |

FOREIGN PATENT DOCUMENTS

| | | |
|---|---|---|
| CA | 1090026 | 11/1980 |
| CA | 2037214 | 9/1991 |
| CA | 2232334 | 11/1998 |
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004033561 | 9/2005 |
| DE | 102005023431 | 11/2006 |
| EP | 0044614 A2 | 1/1982 |
| EP | 0099801 | 2/1984 |
| EP | 354023 | 2/1990 |
| EP | 0461995 | 12/1991 |
| EP | 0524518 A2 | 1/1993 |
| EP | 0547819 A2 | 6/1993 |
| EP | 0583086 A1 | 2/1994 |
| EP | 0714754 A2 | 6/1996 |
| EP | 796681 | 9/1997 |
| EP | 0826710 A2 | 3/1998 |
| EP | 856494 | 8/1998 |
| EP | 0873976 A1 | 10/1998 |
| EP | 878135 | 11/1998 |
| EP | 0882756 A2 | 12/1998 |
| EP | 0911361 A1 | 4/1999 |
| EP | 915811 | 5/1999 |
| EP | 936060 | 8/1999 |
| EP | 976866 | 2/2000 |
| EP | 0990729 A1 | 4/2000 |
| EP | 1038433 A1 | 9/2000 |
| EP | 1193288 A1 | 4/2002 |
| EP | 1084167 | 9/2002 |
| EP | 1268702 | 1/2003 |
| EP | 1382642 | 1/2004 |
| EP | 1486547 A2 | 12/2004 |
| EP | 1522642 | 4/2005 |
| EP | 1698598 A1 | 9/2006 |
| EP | 1767566 | 4/2007 |
| EP | 2223941 | 9/2010 |
| EP | 2253663 | 11/2010 |
| FR | 2614388 | 10/1988 |
| GB | 770561 | 3/1957 |
| GB | 809675 | 3/1959 |
| GB | 926749 | 5/1963 |
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2078805 A | 1/1982 |
| GB | 2173523 | 10/1986 |
| GB | 2251438 | 7/1992 |
| JP | 53113784 | 10/1978 |
| JP | 57101100 | 6/1982 |
| JP | 5811193 | 1/1983 |
| JP | 61195647 | 8/1986 |
| JP | 3-173680 | 7/1991 |
| JP | 05186635 | 7/1993 |
| JP | 7-034023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002293576 | 9/2002 |
| JP | 2003147276 | 5/2003 |
| JP | 2003238921 | 8/2003 |
| JP | 2004060058 | 2/2004 |
| JP | 2005306919 | 11/2005 |
| NZ | 549563 | 1/2008 |
| RU | 1765996 | 8/1995 |
| SU | 374400 | 3/1973 |
| WO | 1990007541 | 7/1990 |
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 200206178 | 1/2002 |
| WO | 2003029496 | 4/2003 |
| WO | 2003071879 | 9/2003 |
| WO | 2003106561 | 12/2003 |
| WO | 2004007615 | 1/2004 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007112335 | 10/2007 |
| WO | 2008089847 | 7/2008 |
| WO | 2008089851 | 7/2008 |
| WO | 2008141201 | 11/2008 |
| WO | 2009019235 | 2/2009 |
| WO | 2009129084 | 10/2009 |
| WO | 2010027937 | 3/2010 |
| WO | 2010139899 | 12/2010 |
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011138458 | 11/2011 |
| WO | 2011138459 | 11/2011 |
| WO | 2013150123 | 10/2013 |

OTHER PUBLICATIONS

International Search Report and Written Opinion for PCT/US2008/069046, completed Sep. 25, 2008.

International Search Report and Written Opinion for PCT/EP2011/059317, completed Jul. 15, 2011.

(56) References Cited

OTHER PUBLICATIONS

International Search Report for PCT/EP2008/060185, completed Oct. 23, 2008.
International Search Report for PCT/EP2011/057363, completed Sep. 5, 2011.
Ames, J.M., "The Maillard Browning Reaction—an Update, "Chemistry & Industry, No. 17, 1988, 4 pages.
"Gamma-aminopropyltrimethoxysilane, "Hawley's Condensed Chemical Dictionary, 14th Edition, John Wiley & Sons, Inc., 2002, 1 page.
Hodge, J.E., Chemistry of Browning Reactions in Model Systems, 1953, J. Agric. Food Chem., vol. 1, No. 15, pp. 928-943.
Agyei-Aye et al., "The Role of Anion in the Reaction of Reducing Sugars with Ammonium Salts," Carbohydrate Research 2002, 337: 2273-2277.
Laroque et al., "Kinetic study on the Maillard reaction. Consideration of sugar reactivity," Food Chemistry 2008, 111: 1032-1042.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 2012, 22 pages.
Decision re Opposition to AU 2006272595, issued from Australian Patent Office, Aug. 14, 2015, 25 pages.
Opposition to EP 1732968, Notice of Opposition: Prior Art, Scope of the Patent, Reasons for the Opposition, issued from European Patent Office, Mar. 8, 2012, 18 pages.
Decision re Opposition to EP 1732968, issued from the European Patent Office, Nov. 14, 2014, 5 pages.
Opposition to EA 019802, submitted to Eurasian Patent Office on Dec. 26, 2014, 36 pages.
Decision re Opposition to EA 019802, issued by Eurasian Patent Office on Aug. 18, 2015, 15 pages.
Owens Corning Retiree Update: What Goes Around, Comes Around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Food Flavor Chemistry, p. 162, Mar. 21, 2009 (English Abstract).
Viswanathan, T., "Chapter 28: Thermosetting Adhesive Resins from Whey and Whey Byproducts," in Adhesives from Renewable Resources, ACS Symposium Series, Hemingway, R.W., et al. (Eds.), American Chemical Society, Washington, DC (1989).
Viswanathan, T., and Richardson, T., "Thermosetting Adhesive Resins from Whey and Whey Byproducts," Ind. Eng. Chem. Prod. Res. Dev. 23:644-47, American Chemical Society, United States (1984).
Residential Energy Conservation: vol. 1, Congress of the U.S., Office of Technology Assessment (Ed.), 357 pages (Jan. 1, 1979).
Office action for co-pending U.S. Appl. No. 12/524,502 (9 pages)—dated Sep. 21, 2012.
Office action for co-pending U.S. Appl. No. 12/524,502 (9 pages)—dated Apr. 4, 2013.
Office action for co-pending U.S. Appl. No. 12/524,512 (7 pages)—dated Aug. 6, 2012.
Office action for co-pending U.S. Appl. No. 12/524,512 (9 pages)—dated Apr. 1, 2013.
Office action for co-pending U.S. Appl. No. 12/524,512 (14 pages)—dated Nov. 12, 2014.
Office action for co-pending U.S. Appl. No. 12/524,512 (9 pages)—dated Jul. 10, 2015.
Office action for co-pending U.S. Appl. No. 12/524,512 (10 pages)—dated Mar. 23, 2016.
Office action for co-pending U.S. Appl. No. 12/524,512 (13 pages)—dated Oct. 5, 2016.
Office action for co-pending U.S. Appl. No. 12/524,512 (13 pages)—dated Apr. 6, 2018.
Office action for co-pending U.S. Appl. No. 12/524,512 (15 pages)—dated Jan. 17, 2019.
Office action for co-pending U.S. Appl. No. 12/524,469 (7 pages)—dated Jun. 7, 2012.
Office action for co-pending U.S. Appl. No. 12/524,469 (8 pages)—dated Jan. 29, 2013.
Office action for co-pending U.S. Appl. No. 12/524,469 (7 pages)—dated Aug. 20, 2013.
Office action for co-pending U.S. Appl. No. 12/524,469 (9 pages)—dated Jun. 9, 2014.
Office action for co-pending U.S. Appl. No. 12/524,469 (9 pages)—dated Oct. 17, 2014.
Office action for co-pending U.S. Appl. No. 12/524,469 (9 pages)—dated Jul. 23, 2015.
Office action for co-pending U.S. Appl. No. 12/524,539 (13 pages)—dated Jun. 21, 2012.
Office action for co-pending U.S. Appl. No. 12/524,539 (13 pages)—dated Jun. 6, 2013.
Office action for co-pending U.S. Appl. No. 12/524,539 (12 pages)—dated Dec. 17, 2014.
Office action for co-pending U.S. Appl. No. 12/524,539 (7 pages)—dated Jul. 15, 2015.
Office action for co-pending U.S. Appl. No. 12/524,539 (7 pages)—dated Mar. 23, 2016.
Office action for co-pending U.S. Appl. No. 12/524,539 (7 pages)—dated Dec. 29, 2016.
Office action for co-pending U.S. Appl. No. 12/524,522 (4 pages)—dated Oct. 11, 2011.
Office action for co-pending U.S. Appl. No. 12/667,718 (5 pages)—dated Sep. 3, 2013.
Office action for co-pending U.S. Appl. No. 12/667,718 (6 pages)—dated Sep. 9, 2014.
Office action for co-pending U.S. Appl. No. 12/671,922 (10 pages)—dated Oct. 7, 2011.
Office action for co-pending U.S. Appl. No. 12/671,922 (10 pages)—dated May 10, 2012.
Office action for co-pending U.S. Appl. No. 12/671,922 (9 pages)—dated Sep. 23, 2014.
Office action for co-pending U.S. Appl. No. 12/671,922 (5 pages)—dated Apr. 4, 2016.
Office action for co-pending U.S. Appl. No. 13/388,408 (5 pages)—dated Aug. 15, 2013.
Office action for co-pending U.S. Appl. No. 13/371,829 (9 pages)—dated Dec. 20, 2012.
Office action for co-pending U.S. Appl. No. 13/371,829 (6 pages)—dated Jul. 12, 2013.
Office action for co-pending U.S. Appl. No. 13/371,829 (6 pages)—dated Aug. 12, 2014.
Office action for co-pending U.S. Appl. No. 13/637,794 (8 pages)—dated Aug. 12, 2013.
Office action for co-pending U.S. Appl. No. 13/637,794 (9 pages)—dated Mar. 26, 2014.
Office action for co-pending U.S. Appl. No. 13/696,439 (11 pages)—dated Jan. 8, 2014.
Office action for co-pending U.S. Appl. No. 13/696,452 (7 pages)—dated Jan. 13, 2015.
Office action for co-pending U.S. Appl. No. 13/696,452 (9 pages)—dated Oct. 27, 2015.
Office action for co-pending U.S. Appl. No. 13/702,144 (6 pages)—dated Jan. 10, 2014.
Office action for co-pending U.S. Appl. No. 13/702,144 (7 pages)—dated Jul. 29, 2014.
Office action for co-pending U.S. Appl. No. 13/823,818 (9 pages)—dated Mar. 26, 2015.
Office action for co-pending U.S. Appl. No. 13/866,368 (16 pages)—dated Aug. 29, 2013.
Office action for co-pending U.S. Appl. No. 13/866,368 (11 pages)—dated Apr. 16, 2014.
Office action for co-pending U.S. Appl. No. 13/866,368 (8 pages)—dated Aug. 21, 2014.

(56) References Cited

OTHER PUBLICATIONS

Office action for co-pending U.S. Appl. No. 13/866,419 (14 pages)—dated Sep. 20, 2013.
Office action for co-pending U.S. Appl. No. 13/866,419 (10 pages)—dated Apr. 25, 2014.
Office action for co-pending U.S. Appl. No. 13/866,419 (8 pages)—dated Oct. 9, 2014.
Office action for co-pending U.S. Appl. No. 13/866,419 (8 pages)—dated Sep. 25, 2015.
Office action for co-pending U.S. Appl. No. 13/868,233 (23 pages)—dated Aug. 13, 2013.
Office action for co-pending U.S. Appl. No. 13/868,233 (12 pages)—dated Apr. 15, 2014.
Office action for co-pending U.S. Appl. No. 13/868,233 (8 pages)—dated Oct. 7, 2014.
Office action for co-pending U.S. Appl. No. 13/868,233 (8 pages)—dated Jul. 16, 2015.
Office action for co-pending U.S. Appl. No. 13/868,238 (8 pages)—dated Jul. 16, 2014.
Office action for co-pending U.S. Appl. No. 12/976,379 (7 pages)—dated Jan. 10, 2012.
Office action for co-pending U.S. Appl. No. 12/976,379 (6 pages)—dated Jul. 27, 2012.
Office action for co-pending U.S. Appl. No. 12/976,379 (9 pages)—dated Mar. 7, 2013.
Office action for co-pending U.S. Appl. No. 12/976,379 (8 pages)—dated Aug. 20, 2013.
Office action for co-pending U.S. Appl. No. 12/599,858 (8 pages)—dated May 11, 2011.
Office action for co-pending U.S. Appl. No. 13/341,542 (8 pages)—dated Dec. 26, 2012.
Office action for co-pending U.S. Appl. No. 13/341,542 (7 pages)—dated Feb. 10, 2014.
Office action for co-pending U.S. Appl. No. 14/026,394 (6 pages)—dated Aug. 14, 2014.
Office action for co-pending U.S. Appl. No. 14/272,556 (14 pages)—dated Nov. 20, 2014.
Office action for co-pending U.S. Appl. No. 14/272,556 (12 pages)—dated Sep. 17, 2015.
Office action for co-pending U.S. Appl. No. 14/342,069 (17 pages)—dated Dec. 29, 2015.
Office action for co-pending U.S. Appl. No. 14/342,069 (22 pages)—dated Sep. 2, 2016.
Office action for co-pending U.S. Appl. No. 14/342,069 (21 pages)—dated Sep. 26, 2017.
Office action for co-pending U.S. Appl. No. 14/342,069 (21 pages)—dated Jun. 6, 2018.
Office action for co-pending U.S. Appl. No. 14/649,277 (9 pages)—dated Jul. 22, 2016.
Office action for co-pending U.S. Appl. No. 14/686,915 (8 pages)—dated Nov. 18, 2016.
Office action for co-pending U.S. Appl. No. 14/810,765 (7 pages)—dated Jan. 29, 2016.
Office action for co-pending U.S. Appl. No. 14/828,916 (8 pages)—dated Nov. 25, 2016.
Office action for co-pending U.S. Appl. No. 14/867,502 (9 pages)—dated Nov. 18, 2016.
Office action for co-pending U.S. Appl. No. 15/172,432 (16 pages)—dated Apr. 17, 2017.
Office action for co-pending U.S. Appl. No. 15/702,087 (5 pages)—dated Nov. 9, 2018.
Office action for co-pending U.S. Appl. No. 15/177,442 (17 pages)—dated May 19, 2017.
Office action for co-pending U.S. Appl. No. 15/378,159 (18 pages)—dated Mar. 2, 2017.
Office action for co-pending U.S. Appl. No. 15/222,122 (8 pages)—dated Nov. 20, 2017.
Office action for co-pending U.S. Appl. No. 15/310,837 (13 pages)—dated Jun. 21, 2018.
Office action for co-pending U.S. Appl. No. 15/411,972 (9 pages)—dated Mar. 28, 2017.
Office action for co-pending U.S. Appl. No. 15/411,972 (8 pages)—dated Nov. 29, 2017.
Office action for co-pending U.S. Appl. No. 15/411,972 (9 pages)—dated Jun. 14, 2018.
Office action for co-pending U.S. Appl. No. 15/116,254 (8 pages)—dated Apr. 26, 2018.
Office action for co-pending U.S. Appl. No. 15/116,254 (10 pages)—dated Aug. 15, 2018.
Office action for co-pending U.S. Appl. No. 15/333,670 (5 pages)—dated Dec. 8, 2017.
Office Action for co-pending U.S. Appl. No. 14/116,048 (10 pages)—dated Jun. 23, 2017.
Office action for co-pending U.S. Appl. No. 15/959,131 (8 pages)—dated Nov. 8, 2019.
Office action for co-pending U.S. Appl. No. 15/822,102 (6 pages)—dated Dec. 6, 2019.
Office action for co-pending U.S. Appl. No. 15/690,623 (6 pages)—dated Jan. 9, 2020.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. In connection with Petition for Inter Partes Review of U.S. Pat. No. 8,114,210).
1st Petition for Inter Partes Review of U.S. Pat. No. D631,670 (68 pages, filed Jun. 19, 2015 by Petitioners Johns Manville Corporation and Johns Manville, Inc.).
2nd Petition for Inter Partes Review of U.S. Pat. No. D631,670 (62 pages, filed Nov. 2, 2015 by Petitioners Johns Manville Corporation and Johns Manville, Inc.).
Decision of PTAB regarding Institution of Inter Partes Review for U.S. Pat. No. D631,670 (33 pages)—Jan. 12, 2016.
Decision2 of PTAB regarding Institution of Inter Partes Review for U.S. Pat. No. D631,670 (27 pages)—May 9, 2016.
Final Written Decision of PTAB regarding Inter Partes Review of D631,670 based on 1st Petition (56 pages)—Jan. 11, 2017.
Final Written Decision of PTAB regarding Inter Partes Review of D631,670 based on 2nd Petition (55 pages)—May 8, 2017.
Court of Appeals for Federal Circuit Judgment from Appeal of PTAB Decisions in Inter Partes Reviews of U.S. Pat. No. D631,670 (2 pages)—Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. In connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. In connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. In connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. In connection with 1st, 2nd and 3rd Petition for Inter Partes Review of U.S. Pat. No. 8,940,089, respectively).
Declaration of Dr. Jonathan Vickers (10 pages, filed Jul. 1, Jul. 10, and Jul. 17, 2015 by Petitioners Johns Manville Corporation and

(56) References Cited

OTHER PUBLICATIONS

Johns Manville, Inc. In connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with $1^{st}$ Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. In connection with $2^{nd}$ Petition for Inter Partes Review of U.S. Pat. No. 9,039,827).
3rd Petition for Inter Partes Review of U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with $3^{rd}$ Petition for Inter Partes Review of U.S. Pat. No. 9,039,827).
Declaration of Dr. Elam Leed (11 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. In connection with 1st, 2nd and 3rd Petition for Inter Partes Review of U.S. Pat. No. 9,039,827, respectively).
Petition for Inter Partes Review of U.S. Pat. No. 9,469,747 (67 pages, filed Mar. 20, 2018 by Petitioners Johns Manville Corporation and Johns Manville, Inc.).
Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Office Action Granting Ex Parte Reexamination of U.S. Pat. No. 7,888,445, dated Dec. 24, 2013, in Control No. 90/013,029, 11 pages.
Office Action Granting Ex Parte Reexamination of U.S. Pat. No. 7,772,347, dated Dec. 24, 2013, in Control No. 90/013,030, 14 pages.
Office Action Granting Ex Parte Reexamination of U.S. Pat. No. 7,854,980, dated Apr. 15, 2014, in Control No. 90/013,156, 20 pages.
Declaration of Jan Rud Andersen submitted in Ex parte Reexamination Control No. 90/013,030, as Document OTH-C, Oct. 10, 2013, 4 pages.
Final Rejection in Ex Parte Reexamination of U.S. Pat. No. 7,888,445 (20 pages)—Jul. 24, 2015.
Final Rejection in Ex Parte Reexamination of U.S. Pat. No. 7,772,347 (23 pages)—Jul. 24, 2015.
Final Rejection in Ex Parte Reexamination of U.S. Pat. No. 7,854,980 (31 pages)—Aug. 18, 2015.
Advisory Action in Ex Parte Reexamination of U.S. Pat. No. 7,888,445 (4 pages)—Oct. 6, 2015.
Advisory Action in Ex Parte Reexamination of U.S. Pat. No. 7,772,347 (4 pages)—Oct. 6, 2015.
Advisory Action in Ex Parte Reexamination of U.S. Pat. No. 7,854,980 (4 pages)—Nov. 18, 2015.
Examiner's Answer in Ex Parte Reexamination of U.S. Pat. No. 7,888,445 (8 pages)—Mar. 23, 2016.
Examiner's Answer in Ex Parte Reexamination of U.S. Pat. No. 7,772,347 (8 pages)—Mar. 23, 2016.
Examiner's Answer in Ex Parte Reexamination of U.S. Pat. No. 7,854,980 (8 pages)—Mar. 22, 2016.
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of PTAB Decisions in Ex Parte Reexamination of U.S. Pat. Nos. 7,888,445, 7,772,347 and 7,854,980 (5 pages)—Mar. 9, 2018.
Notice of Intent to Issue Ex Parte Reexamination Certificate for U.S. Pat. No. 7,772,347 (4 pages)—Oct. 24, 2018.
Notice of Intent to Issue Ex Parte Reexamination Certificate for U.S. Pat. No. 7,888,445 (4 pages)—Dec. 7, 2018.
Notice of Intent to Issue Inter Partes Reexamination Certificate for U.S. Pat. No. 7,888,445 (14 pages)—Sep. 24, 2020.
Notice of Intent to Issue Inter Partes Reexamination Certificate for U.S. Pat. No. 7,772,347 (13 pages)—Sep. 25, 2020.
Decision of USPTO to Reopen Prosecution in Ex Parte Reexamination of U.S. Pat. No. 7,854,980 (7 pages)—Jan. 7, 2019.
Non-final Office Action from Reopened Prosecution in Ex Parte Reexamination of U.S. Pat. No. 7,854,980 (26 pages)—Apr. 3, 2019.
Final Office Action from Reopened Prosecution in Ex Parte Reexamination of U.S. Pat. No. 7,854,980 (11 pages)—Aug. 8, 2019.
Notice of Intent to Issue Ex Parte Reexamination Certificate for U.S. Pat. No. 7,854,980 (3 pages)—Oct. 29, 2019.
Notice of Intent to Issue Inter Partes Reexamination Certificate for U.S. Pat. No. 7,807,771 (4 pages)—Jan. 30, 2014.
Notice of Intent to Issue Inter Partes Reexamination Certificate for U.S. Pat. No. 7,854,980 (6 pages)—Aug. 31, 2017.
Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9, 2015.
Examiner's Determination on Patent Owner Response/Requester Comments after Board Decision in Inter Partes Reexamination of U.S. Pat. No. 7,888,445 (22 pages)—Oct. 17, 2016.
Examiner's Determination on Patent Owner Response/Requester Comments after Board Decision in Inter Partes Reexamination of U.S. Pat. No. 7,772,347 (17 pages)—Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.
Final Decision of PTAB in Inter Partes Reexamination of U.S. Pat. No. 7,888,445 (25 pages)—Sep. 8, 2017.
Final Decision of PTAB in Inter Partes Reexamination of U.S. Pat. No. 7,772,347 (24 pages)—Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Court of Appeals for Federal Circuit Decision re Consolidated Appeal of PTAB Decision in Inter Partes Reexamination of U.S. Pat. No. 7,772,347 and U.S. Pat. No. 7,888,445 (14 pages)—Oct. 15, 2019.
Remand Order of PTAB in Inter Partes Reexamination of U.S. Pat. No. 7,888,445 (3 pages)—Jul. 1, 2020.
Remand Order of PTAB in Inter Partes Reexamination of U.S. Pat. No. 7,772,347 (3 pages)—Jul. 1, 2020.
Decision of PTAB regarding Institution of Inter Partes Review for U.S. Pat. No. 8,114,210 (20 pages)—Oct. 21, 2015.
Final Written Decision of PTAB regarding Inter Partes Review of U.S. Pat. No. 8,114,210 (39 pages)—Oct. 19, 2016.

(56) References Cited

OTHER PUBLICATIONS

Court of Appeals for Federal Circuit Judgment from Appeal of PTAB Decision in Inter Partes Review of U.S. Pat. No. 8,114,210 (5 pages)—Jan. 16, 2018.
Decision of USPTO Granting Ex Parte Re-exam of U.S. Pat. No. 8,114,210 (11 pages)—Apr. 9, 2020.
Decisionl of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Decision of USPTO Granting Ex Parte Re-exam of U.S. Pat. No. 9,828,287 (13 pages)—Jul. 17, 2020.
Decision of USPTO Granting Ex Parte Re-exam of U.S. Pat. No. 9,464,207 (14 pages)—Jul. 31, 2020.
Decision of USPTO Granting Ex Parte Re-exam of U.S. Pat. No. 9,926,464 (18 pages)—Aug. 5, 2020.
Decision of USPTO Granting Ex Parte Re-exam of U.S. Pat. No. 8,940,089 (17 pages)—Oct. 16, 2020.
Decision of USPTO Granting Ex Parte Re-exam of U.S. Pat. No. 9,039,827 (16 pages)—Oct. 16, 2020.
Decision of USPTO Granting Ex Parte Re-exam of U.S. Pat. No. 9,469,747 (16 pages)—Nov. 9, 2020.
Statement of Revocation Grounds re GB2496951—Claimant Rockwool International (May 21, 2018, 22 pages).
Statement of Revocation Grounds re GB2451719—Claimant Rockwool International (May 18, 2018, 22 pages).
Expert Report re Revocation of GB2451719 and GB2496951—Claimant Rockwool International (Nov. 12, 2018, 11 pages).
United Kingdom Intellectual Property Office, Decision in *Rockwool International* v. *Knauf Insulation Limited*, Application under Section 72 for revocation of patents GB2451719 and GB2496951 (May 28, 2019—18 pages).
Decision of EPO Board of Appeal re Added Matter vis-à-vis EP06788492.4 (Jul. 17, 2019—14 pages).
U.S. Pat. No. 2,965,504.
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).

\* cited by examiner

BINDER COMPOSITIONS AND USES THEREOF

CROSS-REFERENCE TO RELATED APPLICATIONS

This application is a U.S. national counterpart application of International Application Serial No. PCT/EP2018/052279, filed Jan. 30, 2018, under 35 U.S.C. § 371, which claims priority to GB Application Serial No. 1701569.4, filed Jan. 31, 2017, the disclosures of which are hereby incorporated herein by reference.

The present invention relates to new improved binder compositions, more specifically curable binder compositions for use in manufacturing products from a collection of non or loosely assembled matter. For example, these binder compositions may be employed to fabricate fiber products which may be made from woven or nonwoven fibers. In one illustrative embodiment, the binder compositions are used to bind glass fibers to make fiberglass. In another illustrative embodiment, the binder compositions are used to bind mineral wool fibers, such as glass wool or stone wool in a matted layer, such as an insulating product. In a further embodiment, the binders are used to fabricate, for example, wood fiber board, particle board or oriented strand board (OSB), which has desirable physical properties (e.g., mechanical strength). Further, the binders may be used to assemble sheets of cellulosic material, such as sheets of wood to manufacture plywood. The invention further extends to a process for using said binder compositions to bound loosely assembled matter, and to a composite product made from loosely assembled matter bound by a binder of the invention.

Several formaldehyde-free binder compositions have been developed in recent times. One such curable binder composition involves sustainable materials and is based on condensation products of a nitrogenous compound, such as ammonium salt of inorganic acids or of polycarboxylic acids or an amine, preferably a polyamine, with reducing sugars as thermosets. These chemistries show several advantages as compared to prior formaldehyde based chemistries.

The present invention seeks to provide an improved curable binder composition suitable for bonding an assembly of matter, including mineral fibers, synthetic fibers and natural fibers, particulate matter such as sand or natural or synthetic particulate material, cellulosic particle or sheet material, showing improved mechanical properties. An objective is to provide an improved binder composition based on renewable and/or sustainable resources. Further, the invention seeks to provide binder compositions that rapidly cure into strong binders.

According to another aspect, the present invention seeks to provide a composite product comprising an assembly of matter bonded by a binder resulting from the curing of above-mentioned binder composition.

According to yet another aspect, the present invention seeks to provide a process for the preparation of a composite product as defined here above. The process should be cost-effective and suitable for large volume production.

The present invention now provides a curable binder composition, a product and a process for making same, as per the attached claims.

It has now been found that curable binder compositions comprising cellulose hydrolysate sugars and a salt of an inorganic acid with ammonia shows particularly good mechanical properties upon curing and is particularly suitable for bonding an assembly of matter as mentioned above. Upon curing, such binder composition produces a highly cross-linked resin which confers improved bond strength to the assembly of matter in accordance with the invention These polymers may be analysed by techniques generally known in the art, including determination of molecular weight, and other known techniques.

The composite product of the invention comprises an assembly of matter comprising mineral fibers, synthetic fibers or natural fibers, cellulosic fibers, cellulosic particles or sheet material, natural or synthetic particulate material, bonded together by a binder obtained by subjecting to curing conditions a curable binder composition as above described. The said binder composition may also comprise some reaction product resulting from the cross-linking between the saccharides of the cellulose hydrolysate and the inorganic ammonium salt crosslinker.

The invention composite product may be prepared by applying invention binder composition on fibrous or particulate matter and subjecting the obtained product to curing conditions.

It has been found that when an aqueous curable binder composition as defined above is applied on a glass fiber veil, it shows high bond strength upon curing, particularly after weathering. The loss of bond strength after weathering is significantly reduced as compared to prior art thermoset binders.

Without being bound by theory, it is believed that the combination of mono and oligosaccharides as obtained after cellulose hydrolysis together with an inorganic ammonium salt is particularly suited as a curable binder composition which confers to a composite product containing it, high or even improved dry bond strength and significantly improved wet bond strength, upon curing.

The binder compositions of the invention and binders produced therefrom are essentially formaldehyde-free (that is comprising less than about 1 ppm formaldehyde based on the weight of the composition) and do not liberate substantial formaldehyde.

The invention compositions may obviously further comprise coupling agents, dyes, antifungal agents, antibacterial agents, hydrophobes and other additives known in the art for such binder applications, as may be appropriate. Silicon-containing coupling agents are typically present in such binders, generally in the range from about 0.1 to about 1% by weight based on the weight of the solids in the binder composition. These additives are obviously selected such as not to antagonise the adhesive properties of the binder nor the mechanical and other desired properties of the final product comprising such binder composition or binder produced therefrom, and advantageously comply with stringent environmental and health related requirements.

According to the present invention, the term "binder composition" is not particularly restricted and generally includes any composition which is capable of binding loosely assembled matter, either as such or upon curing. The binder composition is preferably an aqueous non-cured composition comprising the starting materials for forming a thermoset binder resin and possibly reaction product resulting from the reaction or partial reaction of at least part of the relevant starting materials, and possibly additives. The binder composition may, however, also be solid, the condensation occurring under the effect of heat. Solid binder compositions may be preferred in some particular applications in which water is difficult to evaporate in the course of the curing process; or in applications in which the presence of water may have a deleterious effect on the particles or fibers to be bonded.

As used herein, the term "aqueous" is not particularly limited and generally relates to a solution and/or dispersion which is based on water as a solvent. Said term further includes compositions or mixtures which contain water and one or more additional solvents. An "aqueous binder composition" of the invention may be a solution or partial solution of one or more of said binder components or may be a dispersion, such as an emulsion or suspension.

The term "binder composition" as used herein means all ingredients applied to the matter to be bound and/or present on the matter to be bound, notably prior to curing, (other than the matter and any moisture contained within the matter) including cellulose hydrolysate sugars, any inorganic ammonium salt crosslinker and any additives, and possibly solvents (including water).

The term "binder" is used herein to designate a thermoset binder resin obtained from the "binder composition".

The term "cured" means that the components of the binder composition have been subjected to conditions that lead to chemical change, such as covalent bonding, hydrogen bonding and chemical crosslinking, which may increase the cured product's durability and solvent resistance, and result in thermoset material.

The term "dry weight of the binder composition" as used herein means the weight of all components of the binder composition other than any water that is present (whether in the form of liquid water or in the form of water of crystallization).

The term "crosslinker" as used herein comprises compounds that are capable of reacting with the carbohydrate components of the cellulose hydrolysate to form ramifications or reticulations of the said carbohydrate components.

The terms "inorganic ammonium salt" as used herein means salts of inorganic acid with ammonia. Examples are ammonium sulphate and ammonium phosphate, more specifically diammonium phosphate.

The term "cellulose hydrolysate sugars" as used herein means the carbohydrate composition obtainable by hydrolysis of cellulosic material. Cellulosic material contains cellulose and hemicellulose. Cellulose is a linear polysaccharide composed of 6-carbon saccharide units that constitutes the chief part of the cell walls of plants, occurs naturally in such fibrous products as cotton and kapok, and is the raw material of many manufactured goods (e.g. paper). Hemicellulose is a polysaccharide composed of 5-carbon saccharide units and is present along with cellulose in plant cell walls. While cellulose is strong and resistant to hydrolysis, hemicellulose is much less stable and easier to hydrolysate. It is understood that the hydrolysate sugar composition varies as a function of the feedstock, on the balance between cellulose and hemicellulose and of the hydrolysis process, including acid hydrolysis and enzymatic hydrolysis, and process conditions. Such hydrolysates comprise essentially reducing sugars. Thus the hydrolysate sugar composition comprises monosaccharides, dextrose and xylose, disaccharides, and polysaccharides. The concentration of each of these components in the composition may depend on the feedstock used for hydrolysis purposes, the hydrolysis process and the process conditions. Examples of carbohydrates present are glucose, fructose, sucrose, arabinose, galactose, mannose, xylose, arabinan, galactan, glucan, mannan and xylan.

Advantageously, the cellulose feedstock for hydrolysis may be selected from sugar cane bagasse, cotton fibers, plant material, wood, paper waste, or mixtures thereof. Among other sources, non-recyclable household waste may be used as a source of cellulosic material. The saccharide composition of the hydrolysate will obviously depend on the nature of the source or waste used and the hydrolysis process and process conditions applied. The cellulose hydrolysis sugars may make up 10 to 100 wt % of the carbohydrate component of the invention binder composition (based on dry weight), preferably 50 to 100 wt %, or 60 to 100 wt %, more preferably 70 to 100 wt %, or 80 to 100 wt %, most preferred between 90 and 100 wt % or even between 95 and 100 wt %.

The carbohydrate component of the invention binder composition may comprise 1 to 95 wt % glucose and 0.5 to 15 wt % xylose, preferably 1 to 10 wt % xylose, the remainder being fructose, mannose, galactose and/or polysaccharide fraction, such as glucan and/or xylan for instance. Other polysaccharides that may be present are arabinan, galactan, and/or mannan. In said carbohydrate component, the polysaccharide content may vary between 1 and 90 wt %, preferably between 3 and 20 wt % or between 3 and 15 wt % or between 3 and 10 wt %. It will be understood that, depending on feedstock and processing, the polysaccharide fraction is a blend of polysaccharides of different polymerization degrees, varying from 2 to 20, preferably 2 to 15, with an average polymerization degree comprised between 3 and 7, preferably between 3 and 5; which means that polysaccharides of lower polymerization degree show the higher concentrations.

Preferably, the carbohydrate component comprises 1 to 90 wt glucose and/or glucan, 0.5 to 15 wt % xylose, preferably 1 to 10 wt % xylose, the remainder being fructose, mannose, galactose, glucan, xylan, arabinan, galactan and/or mannan.

The solid content of the invention aqueous binder composition may range from 5 to 95 w %, advantageously from 8 to 90 w %, preferably from 10 to 85 w %, based on the weight of the total aqueous binder composition. More specifically, when used as a binder for mineral wool insulation, the solid content of the aqueous binder composition may be in the range from 5 to 25 w %, preferably from 8 to 20 w %, more preferably from 10 to 20 w % or even 12 to 18 w %, based on the weight of the total aqueous binder composition. When used as a binder in wood boards, such as plywood, particle boards, fiber boards, the solid content of the aqueous binder composition may range from 50 to 95 w %, preferably 50 to 90 w %, more preferably 55 to 85 w % or even 60 to 80 w %, based upon the weight of the total aqueous binder composition.

The components of the invention binder compositions may be transported separately and combined shortly before use in the relevant manufacturing plant. It is also possible to transport the binder composition as such, possibly in a prereacted stage.

The binders of the invention may be used to bond a collection of non or loosely assembled matter. The collection of matter includes any collection of matter which comprises fibers selected from mineral fibers, including but not limited to slag wool fibers, stone wool fibers, glass fibers, aramid fibers, ceramic fibers, metal fibers, carbon fibers, polyimide fibers, polyester fibers, rayon fibers, and cellulosic fibers. Further examples of collection of matter include particulates such as sand, coal, cellulosic particles, wood shavings, saw dust, wood pulp, ground wood, wood chips, wood strands, wood layers; other natural fibers, such as jute, flax, hemp, straw, wood veneers, facings and other particulate materials, woven or non-woven fiber materials. According to a specific embodiment of the invention, the collection of matter is selected from wood particles and mineral fibers.

In one illustrative embodiment, the binder composition of the invention may be used to make insulation products, comprising mineral fibers. In such an application, the fibers are bonded together such that they become organized in a fiber mat which may then be processed into an insulation product, for instance based on glass wool or stone wool. In such an application, the fibers are generally present in an amount ranging from 70 to 99% by weight.

The invention binder composition may also be used to manufacture a non-woven fiber veil, e.g. glass fiber veil, which may then find application in battery separators, as substrate for roofing products such as roofing membranes or shingles, or other membranes.

According to another embodiment of the invention, the binder may be used to bond cellulosic particles, such as cellulosic fibers, wood shavings, wood layers or sheets, wood pulp and other materials commonly used to manufacture composite wood boards, including fiber boards, particle boards, oriented strand boards, plywood etc. Such wood boards show nominal thicknesses ranging from 6 to 30 mm and a modulus of Elasticity of at least about 1000 N/mm$^2$, bending strength of at least about 5 N/mm$^2$ and/or an internal bond strength of at least 0.10 N/mm$^2$. In such applications, the binder content in the final wood board may range from about 5 to 30% wt with respect to the total weight of the wood board notably from 9 to 20%.

The binder of the invention may further be used to bond cellulosic fibers in a fiber mat used to make filters, such as oil filters.

According to the invention, the aqueous binder composition may be applied in a manner known per se onto the fiber or particulate or sheet material. The binder composition may preferably be applied by spray application. Other techniques include roll application or mixing and/or tumbling the collection of matter with the binder composition. As water evaporates the aqueous binder composition forms a gel that bonds the particulate material together when arranged into a desirable assembly as detailed further herein below. When curing, the reactive binder components are caused to react to form essentially water insoluble macromolecular binder resin. Curing thus imparts increased adhesion, durability and water resistance as compared to uncured binder. Curing may be effected at temperatures between ambient (from about 10 to 25° C.) and up to 280° C.

The obtained product may then be further processed in suitable process steps to make intermediate or final products, including but not limited to insulation products or wood boards. More specifically, a process for the manufacturing of an assembly of fibers or cellulosic particles or sheets may comprise (i) the provision of (a) a cellulose hydrolysate, (ii) the provision of appropriate amounts of (b) an inorganic ammonium salt, (iii) the successive or simultaneous application of (a) and (b), possibly as an aqueous composition comprising (a) and (b) and possibly (a) cross-linked by (b), onto fibrous or cellulosic particulate or sheet material to produce resinated material, and (v) subjecting the resulting resinated material to curing conditions and allowing for evaporation of excess water.

Curing may be effected at a temperature ranging from 90-200° C., preferably higher than 140° C., more preferably lower than 190° C., typically between 160 and 180° C. In the manufacture of wood boards, curing is performed while the material is subjected to pressing.

The invention will be explained in more details in the examples below with reference to the attached Figures, in which:

FIG. 3 shows tensile strength data for invention sample 5 compared to glucose based binder compositions; and.

EXAMPLE 1

Figure 1:
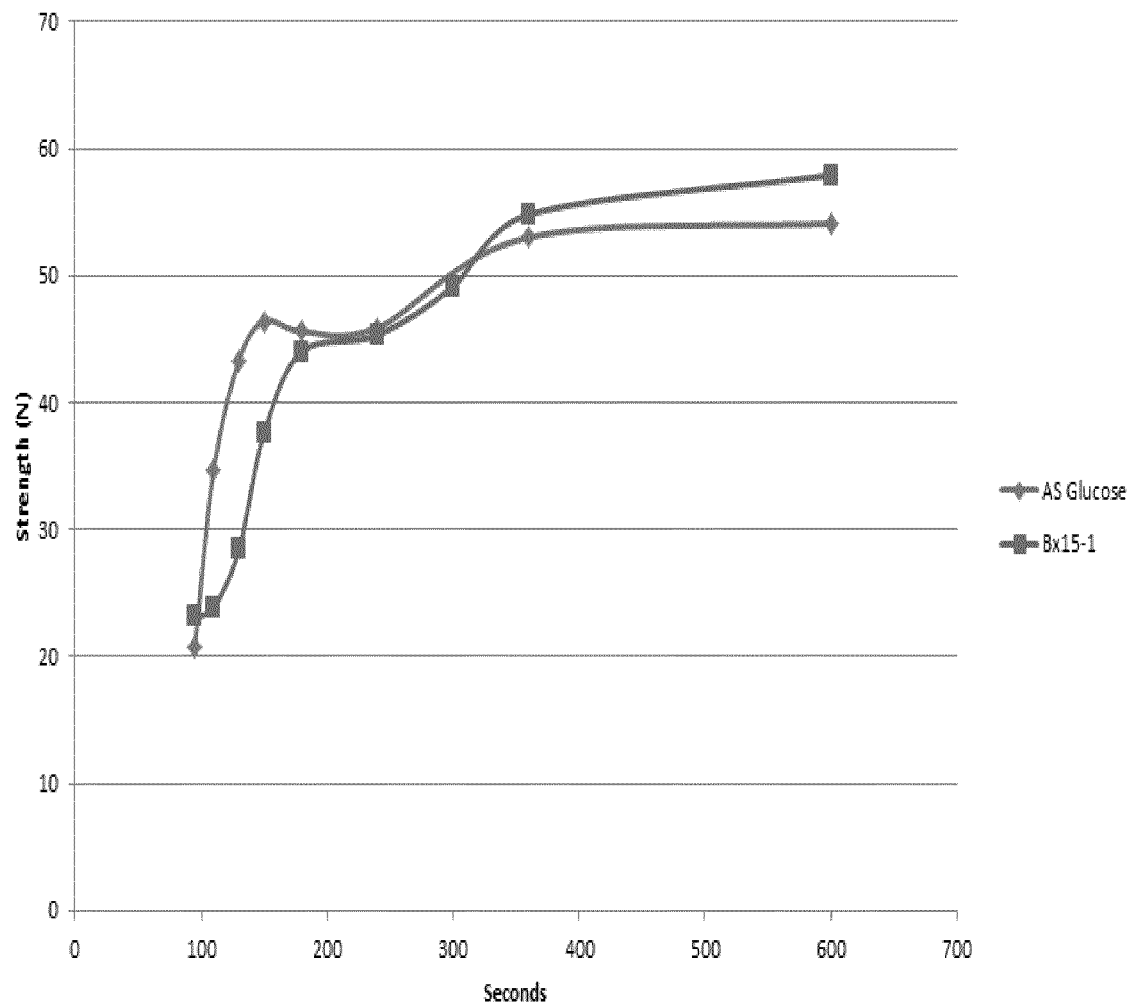
FIG. 1 shows tensile strength of invention sample 1 compared to standard glucose based binder compositions.
Figure 2:
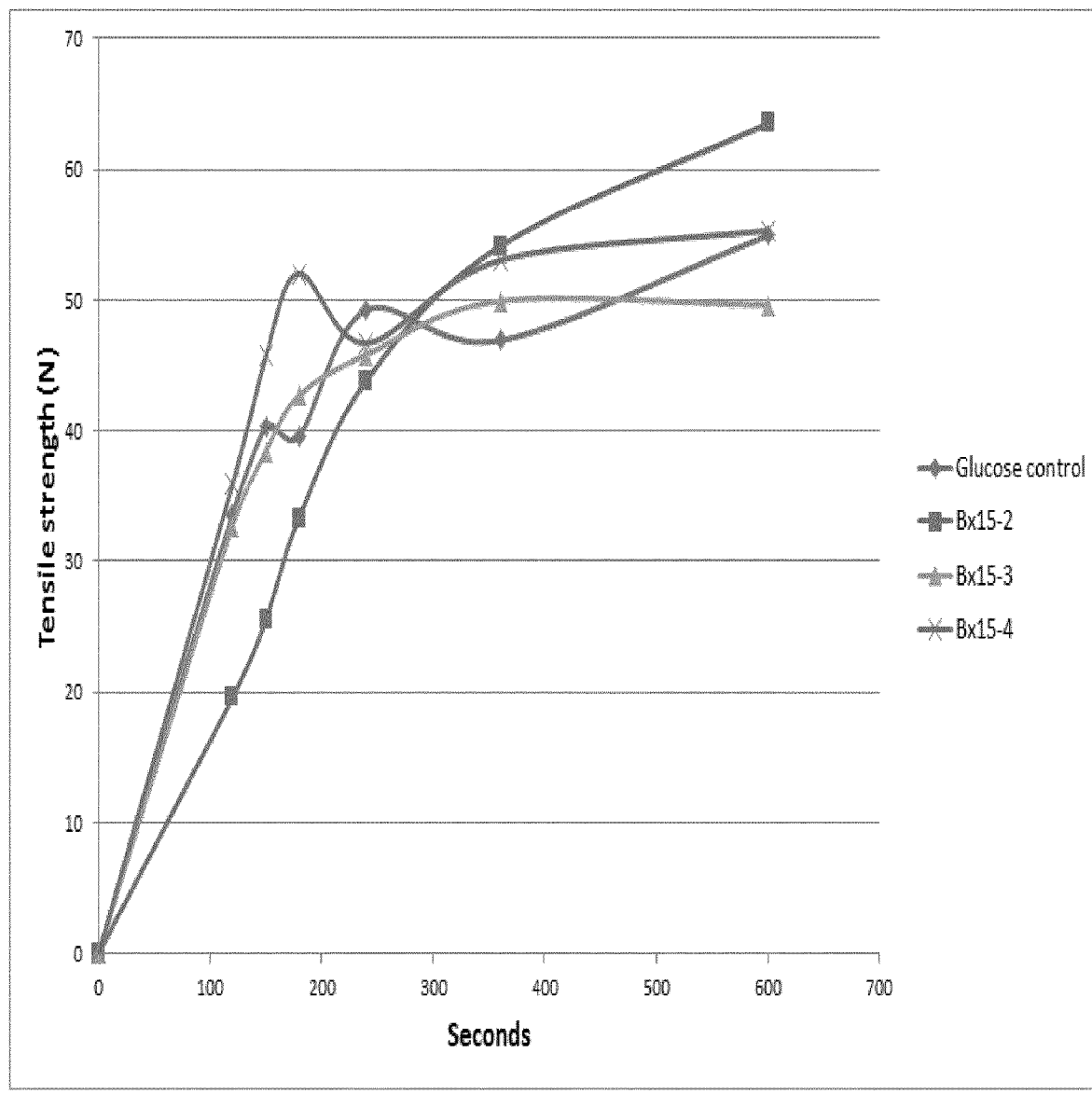
FIG. 2 shows tensile strength data for invention samples 2, 3 and 4 compared to standard glucose based binder compositions.
Figure 3:
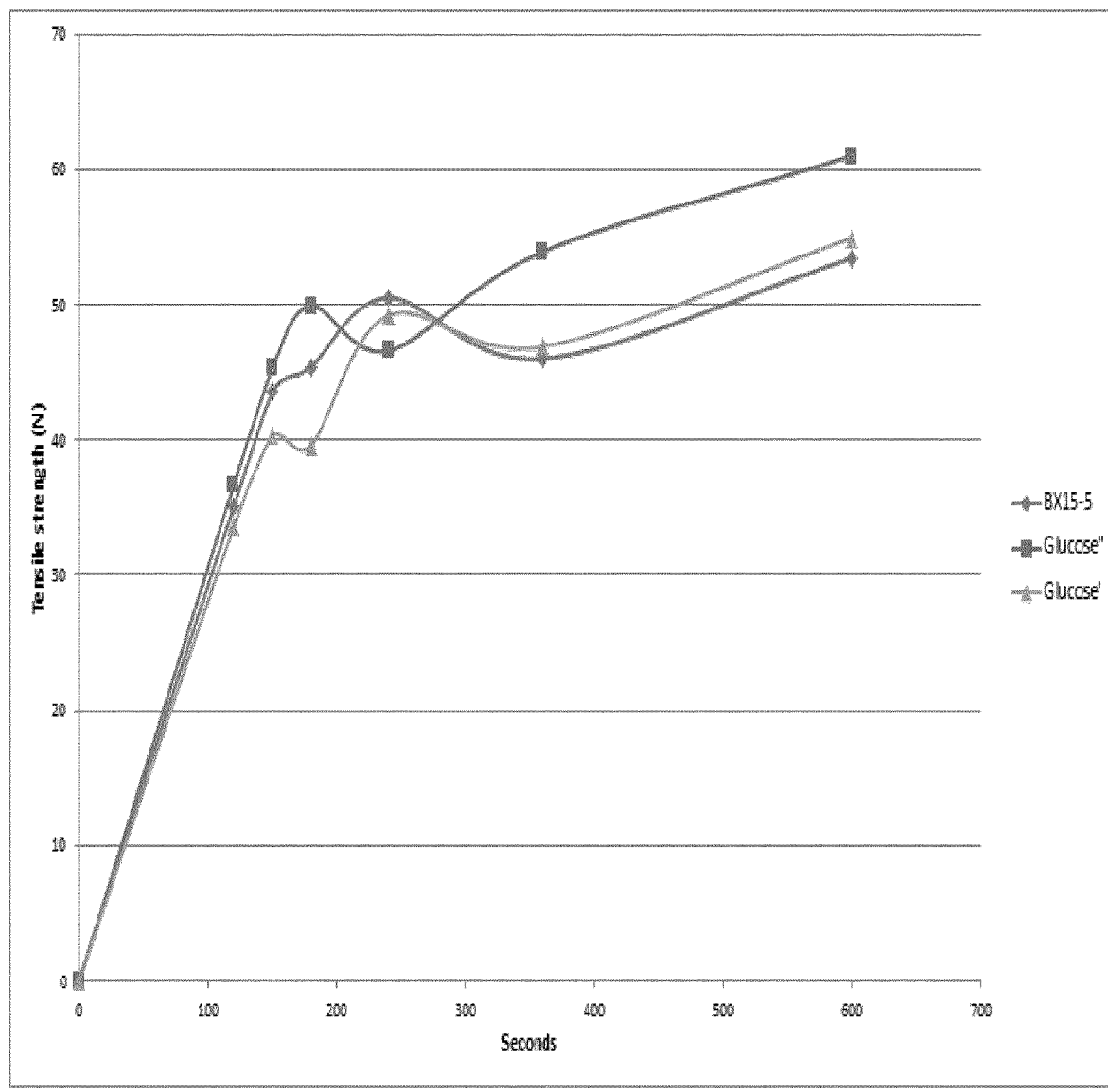
Figure 4:
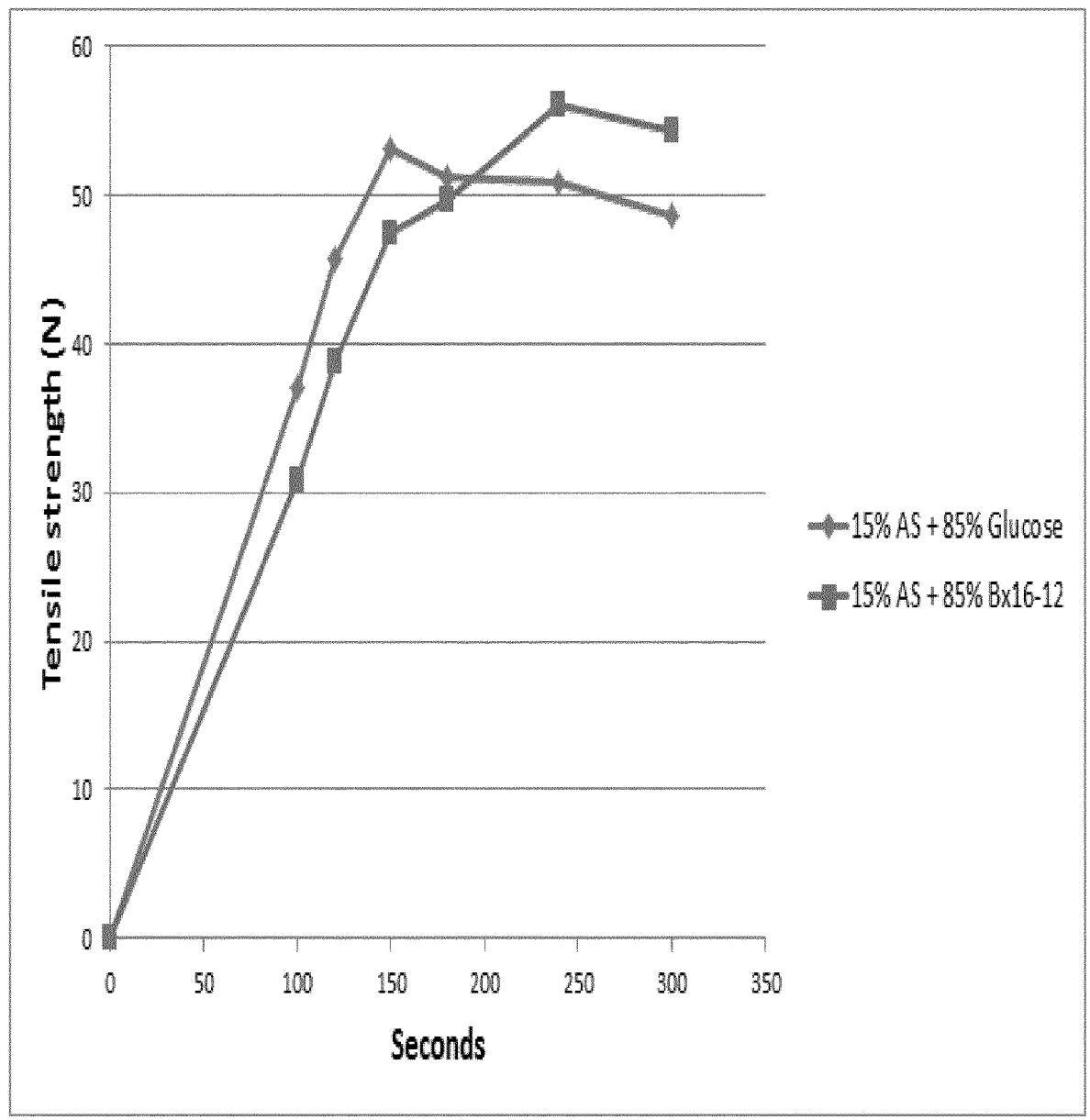
FIG. 4 shows tensile strength data for invention sample 12 compared to standard glucose based binder compositions

An invention binder composition comprising cellulose hydrolysate and ammonium sulphate in a ratio of 85 parts total sugars for 15 parts ammonium sulphate was prepared. The cellulose hydrolysate has been obtained by enzymatic digestion of cellulosic material contained in household waste and shows the following composition (in parts by weight):

| Sample | % Glucose | % Xylose | % Oligomers | Total |
|---|---|---|---|---|
| 1 | 8 | 0.8 | 0.5 | 9.3 |
| 2 | 5.6 | 0.8 | 0.5 | 6.9 |
| 3 | 9.2 | 1.7 | 0.9 | 11.8 |
| 4 | 10.1 | 2.3 | 1.8 | 14.2 |
| 5 | 36.2 | 6.3 | 4.3 | 46.8 |
| 12 | 4.4 | 0.2 | 0.2 | 4.8 |

For comparison purposes, a binder composition comprising dextrose and ammonium sulphate in the same ratio was prepared.

Commercial Urea formaldehyde impregnated (A4 size) glass fiber veils were placed into a muffle furnace oven for 30 minutes at 600° C. in order to burnout the PF binder, and were then allowed to cool for 30 minutes. The obtained veil samples were weighted.

Approx. 400 g binder solution (2% solids) samples were poured into dip trays, and the obtained veil samples carefully fully immersed into the relevant binder solutions. The impregnated veils were cured at 190° C. for indicated periods of time varying from 0 to 600 seconds. Binder content was then measured and tensile strength determined as follows.

The tensile strength of the relevant cured binder impregnated veils was determined by means of mechanical testing instrument (M350-10CT). For each test a cured binder impregnated A4 veil was cut into 8 equal strips. Each strip was tested separately using a 50 Kg load cell (DBBMTCL-50 kg) at an automated test speed of 10 mm/min controlled by winTest Analysis software. Glass veil tensile plates were attached to the testometric machine in order to ensure a 100 mm gap between plates. Samples were placed vertically in the grippers; and the force was tarred to zero. Various parameters such as maximum load at peak, stress at peak and modulus at peak were evaluated by the software, and data presented as an average of 8 samples with standard deviation. The average maximum load at peak or stress at peak defined as the tensile strength.

The figures show development of strength as cure evolves. As can be seen in the figures for relevant samples, the cellulose hydrolysate based binder compositions confer similar or improved strength as compared to glucose based binders comprising the same amount of total sugar.

It has further been found that the dry bond strength is significantly improved for invention binder compositions as compared to standard glucose based binder compositions, both compositions having the same amount of total sugar.

What is claimed is:

1. A curable binder composition comprising a carbohydrate component and an inorganic ammonium salt, wherein the carbohydrate component comprises cellulose hydrolysate sugars comprising monosaccharides, including dextrose and xylose, disaccharides, and polysaccharides, wherein the cellulose hydrolysate sugars comprise 1-95 wt. % glucose and 0.5-15 wt. % xylose.

2. The curable binder composition of claim 1, wherein the curable binder composition is aqueous and comprises a solids content of 5-95 wt. %, based on the weight of the total aqueous binder composition.

3. The curable binder composition of claim 1, wherein further to dextrose and xylose the cellulose hydrolysate sugars comprise one or more saccharides as a remainder selected from the group consisting of fructose, mannose, galactose, and a polysaccharide fraction.

4. The curable binder composition of claim 3, wherein the polysaccharide fraction comprises arabinan, galactan and mannan of polymerization degrees ranging from 2-20.

5. The curable binder composition of claim 1, further comprising one or more coupling agents, dyes, antifungal agents, antibacterial agents, hydrophobes and other additives known in the art.

6. The curable binder composition of claim 1, further comprising 0.1-1.0 wt. % of a silicon-containing coupling agent, based on the weight of the solids in the binder composition.

7. An assembly of matter comprising mineral fibers, synthetic fibers or natural fibers, cellulosic particle or sheet material, bonded together by the curable binder composition of claim 1 and/or reaction product(s) resulting from the condensation of the carbohydrate component and inorganic ammonium salt of the curable binder composition of claim 1, or by a binder produced by subjecting the curable binder composition of claim 1 to curing conditions.

8. The assembly of matter of to claim 7, comprising an insulation product comprising 70-99 wt. % mineral fibers based on glass wool or stone wool, and bonded together such that they become organized in a fiber mat to be processed into an insulation product.

9. The assembly of matter of claim 7, being a non-woven glass fiber veil for use in battery separators or as substrate for roofing membranes or shingles.

10. The assembly of matter of to claim 7, comprising one or more of sand particles, cellulosic fibers, wood shavings, wood layers, wood sheets, wood pulp, fiber boards, particle boards, oriented strand boards, plywood and additional materials commonly used in the manufacturing of composite wood boards, wherein the curable binder composition comprises about 5 to about 30 wt. % with respect to the total weight of the assembly of matter.

11. A process for producing the assembly of matter of claim 7, comprising (i) the provision of (a) a carbohydrate component comprising cellulose hydrolysate sugars, (ii) the provision of appropriate amounts of (b) an inorganic ammonium salt, (iii) the successive or simultaneous application of (a) and (b), optionally as an aqueous composition comprising (a) and (b) and optionally (a) cross-linked by (b), onto particulate, fibrous or cellulosic particulate or sheet material to produce resinated material, and (iv) subjecting the resulting resinated material to curing conditions and allowing for evaporation of excess water.

12. The process of claim 11, wherein the curing conditions are performed at a temperature ranging from 90-200° C.

* * * * *